United States Patent

Dähler et al.

[11] Patent Number: 5,999,428
[45] Date of Patent: Dec. 7, 1999

[54] INVERTOR WITH REDUCED COMMON MODE VOLTAGE

[75] Inventors: Peter Dähler, Remigen; Osvin Gaupp, Baden; Gerhard Linhofer, Baden-Dättwil, all of Switzerland; Jean-François Ravot, Chevry, France

[73] Assignee: Asea Brown Boveri AG, Baden, Switzerland

[21] Appl. No.: 09/137,746

[22] Filed: Aug. 21, 1998

[30] Foreign Application Priority Data

Aug. 22, 1997 [DE] Germany ............ 197 36 613

[51] Int. Cl.⁶ .................................. H02M 7/00
[52] U.S. Cl. ........................... 363/71; 307/83
[58] Field of Search ............ 363/71, 39; 307/83, 307/82

[56] References Cited

U.S. PATENT DOCUMENTS

| | | | |
|---|---|---|---|
| 4,159,513 | 6/1979 | Gemp et al. | 363/43 |
| 4,426,678 | 1/1984 | Willis et al. | 363/25 |

OTHER PUBLICATIONS

ABB Industries AG, Stromrichteranlagen, CH–5300 Turgi/Schweiz, "Vollstatische 100 MW–Frequenzkupplung Bremen", Aug. 1996, pp. 1–15.

*Primary Examiner*—Shawn Riley
*Attorney, Agent, or Firm*—Oblon, Spivak, McClelland, Maier & Neustadt, P.C.

[57] ABSTRACT

An inverter having a plurality of inverter bridges which operate in parallel and whose output voltage is summed by way of a transformer. The transformer has a number of primary windings and associated secondary windings which correspond to the number of inverter bridges. Each inverter bridge is connected on the output side to a primary winding. The secondary windings are connected in series to sum the output voltages. The transformer has a center tap which is grounded by a ground connection. The suppression of in-phase or common-mode interference currents flowing by the ground connection and the interference voltages associated therewith is achieved by dividing the secondary windings into a first and second identical partial secondary winding. The partial secondary windings are connected to one another in the center tap in such a way that the common-mode currents and voltages induced in the partial secondary windings mutually cancel.

4 Claims, 5 Drawing Sheets excluded: 5,999,428

INVERTOR WITH REDUCED COMMON MODE VOLTAGE

BACKGROUND OF THE INVENTION

1. Field of the Invention

The present invention is concerned with the field of power electronics. It relates to an invertor comprising a plurality of invertor bridges, which operate in parallel from the same DC voltage source and whose output voltages are summed via a transformer, which transformer has a number of primary windings and associated secondary windings which corresponds to the number of invertor bridges, each invertor bridge being respectively connected on the output side to a primary winding, and the secondary windings being connected in series for the purpose of summing the output voltages, and the invertor bridges each being driven with pulse duration modulation according to an auxiliary control voltage, and the auxiliary control voltages of the individual invertor bridges having a constant phase difference between one another, and the transformer having a center tap, which is grounded via a ground connection.

2. Discussion of Background

In order to connect electricity supply systems having a different number of phases and/or AC voltage frequency, such as e.g. between a 50 Hz three-phase power supply system and a single-phase 16⅔ Hz railway grid, use is increasingly being made of solid-state couplings and railway power converters which are equipped with power semiconductors and are often designed as converters having a DC voltage intermediate circuit. In accordance with FIG. 1, such a railway power converter 10 comprises, for example, a (thyristor-equipped) converter 13 which draws the three-phase current from the three-phase power supply system 11 via a transformer 12 and converts it into a direct current, a DC voltage intermediate circuit 14 for smoothing and/or buffer-storage, and an invertor 15 which converts the direct current back into an alternating current at the desired frequency and feeds it into the railway grid 16.

In the invertor 15, use is usually made of one or more invertor bridges, operating in parallel, with switchable valves (e.g. GTOs), which are driven with pulse duration modulation and approximate the desired sinusoidal output voltage by a sequence of duration-modulated square-wave pulses of alternating polarity. A triangular-waveform auxiliary control voltage is usually used in this case for the pulse duration modulation. Details about the driving can be found for example in an offprint (No. 9608-1000-0) from the applicant "Vollstatische 100-MW-Frequenzkupplung Bremen" [Solid-state 100 MW frequency coupling Bremen]. If a plurality of invertor bridges are operated in parallel, the output voltages are summed. A reduction in the harmonic content is achieved by driving the individual invertor bridges via the auxiliary control voltages in a phase-shifted manner.

An example of the structure of an invertor 15 is represented in FIG. 2. The invertor 15 of this example comprises 8 invertor bridges B1, . . . , B8 which operate in parallel and, with a respective capacitor C1, . . . , C8 in parallel at the input, are connected to the input lines 17, 18 coming from the DC voltage intermediate circuit 14. A transformer 19 is provided for the purpose of summing the output voltages of the invertor bridges B1, . . . , B8, which transformer contains a winding pair comprising a primary winding P1, . . . , P8 and a secondary winding S1, . . . , S8 for each of the invertor bridges B1, . . . , B8. The outputs of the invertor bridges B1, . . . , B8 are respectively connected to the corresponding primary windings P1, . . . , P8; the secondary windings S1, . . . , S8 are connected in series. The summed output signal is available on the output lines 20, 21. In order to suppress harmonics, the transformer 19 may additionally be equipped with tertiary windings T1, . . . , T8, which are connected in series and are damped by a corresponding filter circuit 25 (in this respect see, for example, EP-B1-0 149 169). Examples of duration-modulated and phase-shifted pulse trains for the invertor bridges B1, . . . , B8 are represented in FIG. 3. Summation of the individual pulse trains in the transformer 19 produces therefrom the resultant summation voltage $u_{Bi}$ in FIG. 4.

Problems with the type of invertor illustrated in FIG. 2 arise if—as is necessary in the case of some railway grids—the transformer 19 of the invertor 15 is grounded at a center tap 23 by a ground connection 24 via a resistor 22 (or else without a resistor, that is to say in "hard" fashion) (see FIG. 2). These problems may be illustrated with reference to the equivalent circuit diagrams represented in FIGS. 5 to 8: The invertor, which operates as a voltage source converter (Voltage Source Converter, VSC), can be described in principle (FIG. 5) by a voltage source 26 having the voltage $u_{Bi}$ which drives a corresponding current $i_{Bi}$ through a circuit formed by the impedances 27, 28 and 29. The impedances 27 and 28 with the values $z_1$ and $z_2$, respectively, represent the transformer 19, and the impedance 29 with the value $z_3$ represents the filter circuit 25. The railway grid 16 can be described in the equivalent circuit diagram by the impedance 30 ($z_4$) and the voltage source 31.

As a result of the grounding (via the resistor 22) at the center tap 23 of the transformer 19, the equivalent circuit diagram of the VSC from FIG. 5 can be converted into an equivalent circuit diagram in accordance with FIG. 6. The voltage source 26 is in this case divided into two voltage sources 32 and 33 having the partial voltages $u_{Bi,a}$ and $u_{Bi,b}$, where:

$$u_{Bi}=u_{Bi,a}-u_{Bi,b} \quad (1)$$

The impedances 27 and 28 of the transformer 19 are now divided in FIG. 6 into impedances 34 and 39 and, respectively, 35 and 40, in each case having half the original impedance value, namely $z_1/2$ and $z_2/2$. The impedance 29 with the value $z_3$ is preserved while the impedance 30 and the voltage source 31 of the railway grid 16 are likewise divided into the impedances 36 and 41 (in each case having the value $z_4/2$) and, respectively, voltages sources 42 and 43. The grounding via the center tap 23 of the transformer 19 is represented by the resistor 37 having the value $R_E$ in FIG. 6. A corresponding resistor 38 having the value $R_{E,r}$ describes the total remote grounding resistance of the railway grid 16.

According to the concept of modal decomposition, the equivalent circuit diagram of FIG. 6 can be decomposed into two superposed subsystems, namely into the common-mode system and the differential-mode system. The two superposed systems can then be treated separately from one another and the resultant currents and voltages simply added at the end of the analysis in order to obtain the real physical quantities. The equivalent circuit diagram in the common-mode system for the upper half of the VSC is represented in FIG. 7. In addition to the already known impedances 34, 35 and 36, the circuit contains the resistors 45 and 46, which each amount to twice the grounding resistors 37 and 38, respectively. The voltage source 44 outputs a voltage $u_{Bi,CM}$ which drives a current $i_{Bi,CM}$ through the circuit. The equivalent circuit diagram in the differential-mode system for the upper half of the VSC is illustrated in FIG. 8. In addition to the already known impedances 34, 35 and 36, the impedance 48 is present here as well, which impedance corresponds to half the impedance 29 and is characteristic of the filter circuit 25. The voltage source 47 outputs a voltage $u_{Bi,D}$ which drives a current $i_{Bi,D}$ through the circuit.

The following relationship emerges for the voltages and currents:

$$u_{Bi,a} = u_{Bi,CM} + u_{Bi,D} \tag{2}$$

$$u_{Bi,b} = u_{Bi,CM} - u_{Bi,D}, \tag{3}$$

and also $$i_{Bi} = i_{Bi,CM} + i_{Bi,D} \tag{4}$$

and $$i_E = 2 * i_{Bi,CM} \tag{5}.$$

It is immediately evident from FIGS. 5 to 8 and equations (1) to (5) that the common-mode voltage $u_{Bi,CM}$ is undesirable because it drives a common-mode current $i_{Bi,CM}$ which can flow back only through the grounding resistors 37 and 38. The level of the common-mode current $i_{Bi,CM}$ is primarily limited by the impedances $z_1$ and $z_2$ of the transformer 19. The common-mode current $i_{Bi,CM}$ has two disadvantageous effects:

It causes considerable losses both in the local grounding resistor 22 or 37 and in the remote grounding resistor 38. As shown by simulations of a real plant (power approximately 50 MW), the losses in the grounding resistor 22 (at a nominal resistance of $R_E=334$ W) can be approximately 50 kW and are therefore of an unacceptable order of magnitude.

In the railway grid (for example a 138 kV grid), it can cause interference in adjacent communications equipment.

SUMMARY OF THE INVENTION

Accordingly, one object of the invention is to provide a novel VSC invertor in which the currents flowing via the ground connection are suppressed or attenuated to a harmless value.

In the case of an invertor of the type mentioned in the introduction, the object is achieved by virtue of the fact that, in order to attenuate or suppress in-phase or common-mode interference currents flowing via the ground connection within the transformer, the secondary windings are each divided into a first and second identical partial secondary winding, and the partial secondary windings are connected to one another and to the center tap in such a way that the common-mode voltages induced in the partial secondary windings mutually cancel one another out. The particular advantage of the solution according to the invention consists in the fact that common-mode voltage components $u_{Bi,CM}$ and common-mode current components are avoided without the spectral quality of the differential-mode voltage $u_{Bi,D}$ and of the differential-mode currents being adversely affected in any way.

A preferred embodiment of the invention is distinguished by the fact that the first partial secondary windings form a first series circuit, that the second partial secondary windings form a second series circuit, which is in parallel with the first series circuit, that the upper output of the first series circuit forms one output of the invertor and the lower output of the second series circuit forms the other output of the invertor, and that the lower output of the first series circuit and the upper output of the second series circuit are joined together at the center tap.

An invertor according to the invention is preferably used in a converter having a DC voltage intermediate circuit, in particular in a railway power converter or a frequency coupling.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
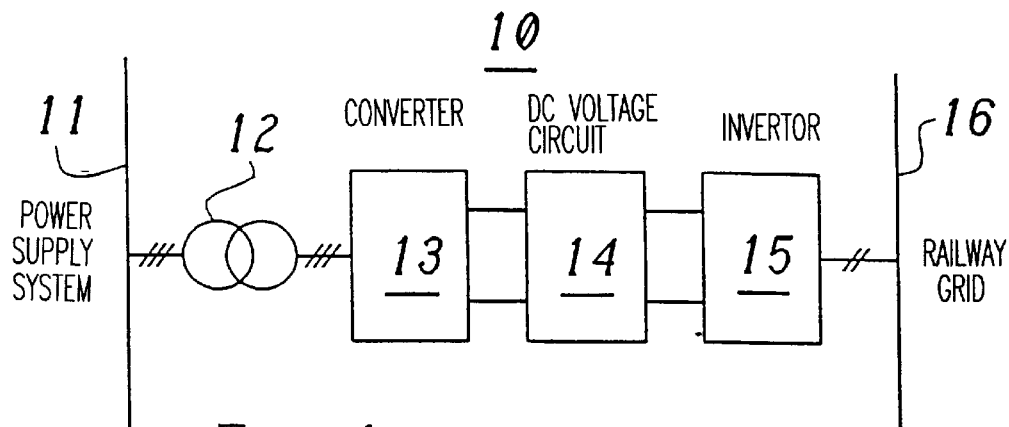
FIG. 1 shows the fundamental structure of a railway power converter.
Figure 2:
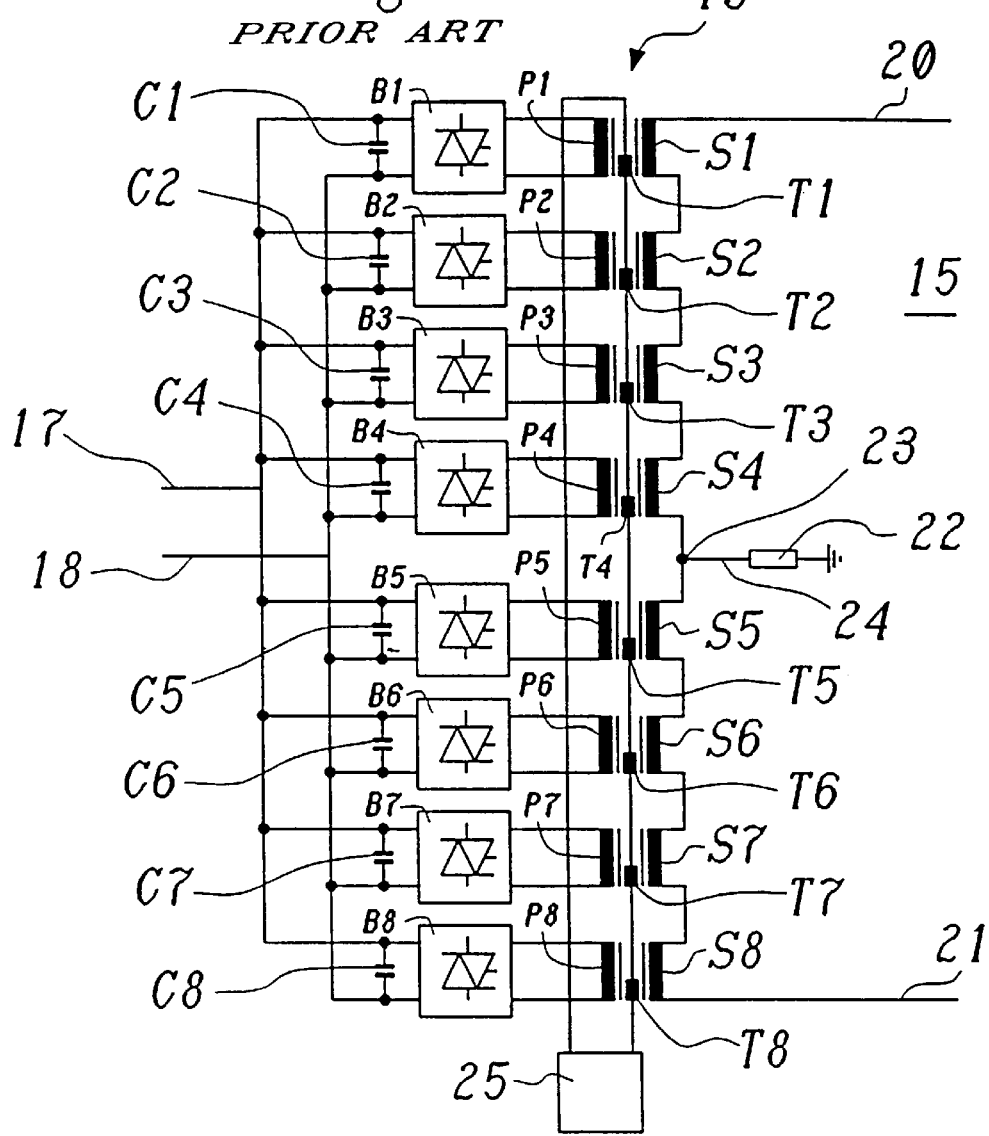
FIG. 2 shows the block diagram of an invertor, suitable for the railway power converter according to FIG. 1, with a plurality of invertor bridges in parallel and with center-point grounding of the transformer.
Figure 3:
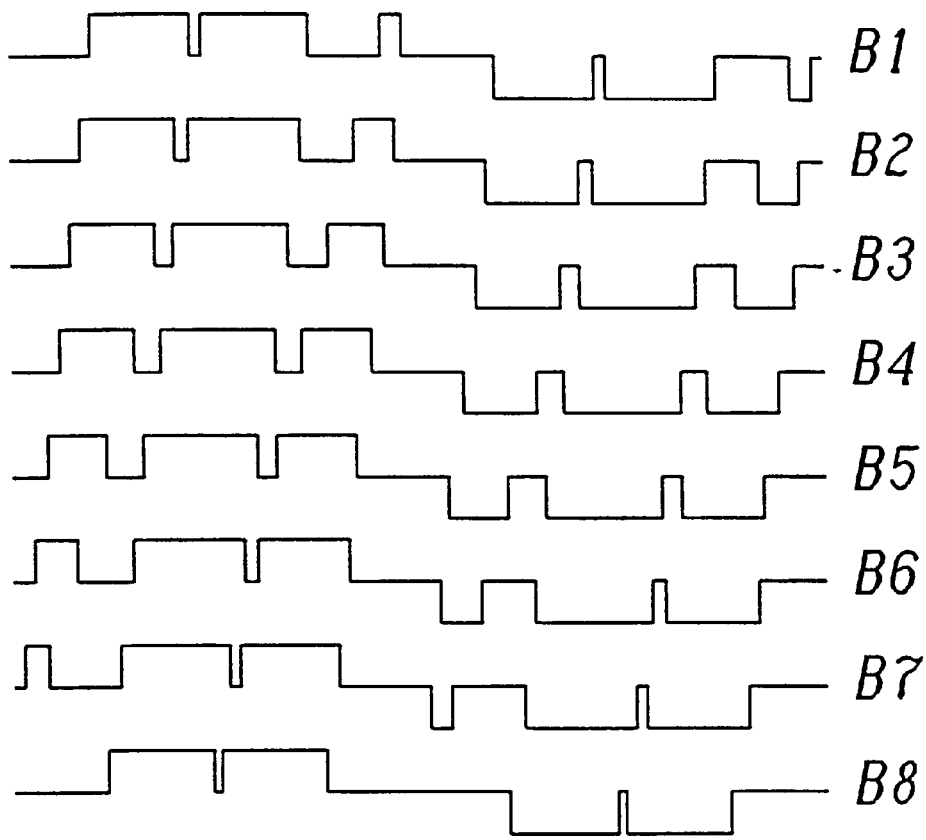
FIG. 3 shows examples of pulse duration-modulated output pulse trains of the individual invertor bridges from FIG. 2.
Figure 4:
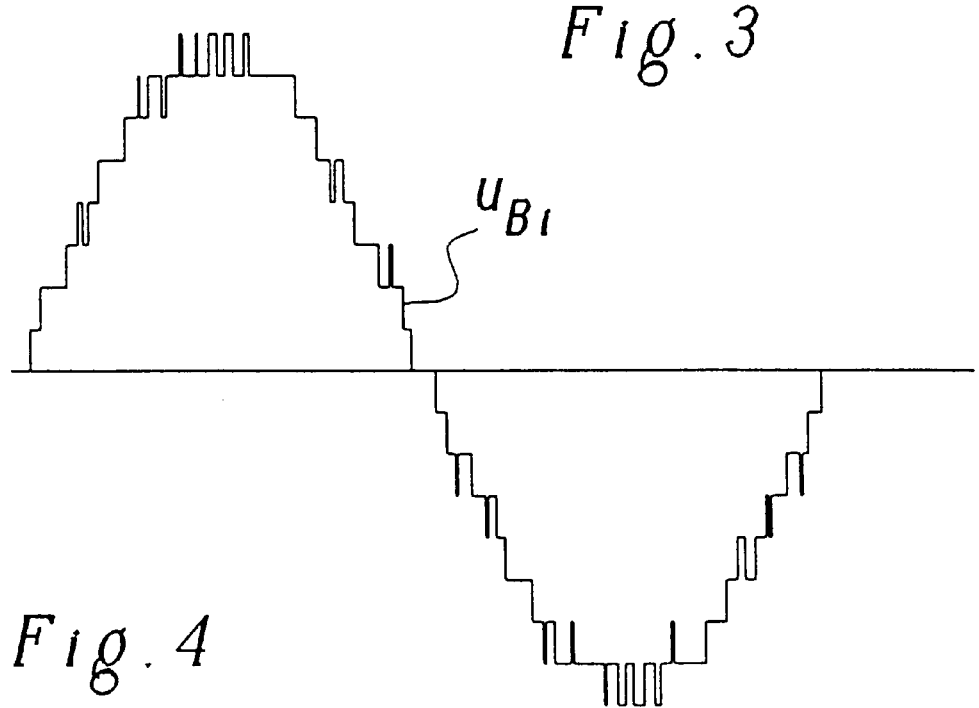
FIG. 4 shows the summation voltage resulting from summation of the output pulse trains from FIG. 3.
Figure 5:
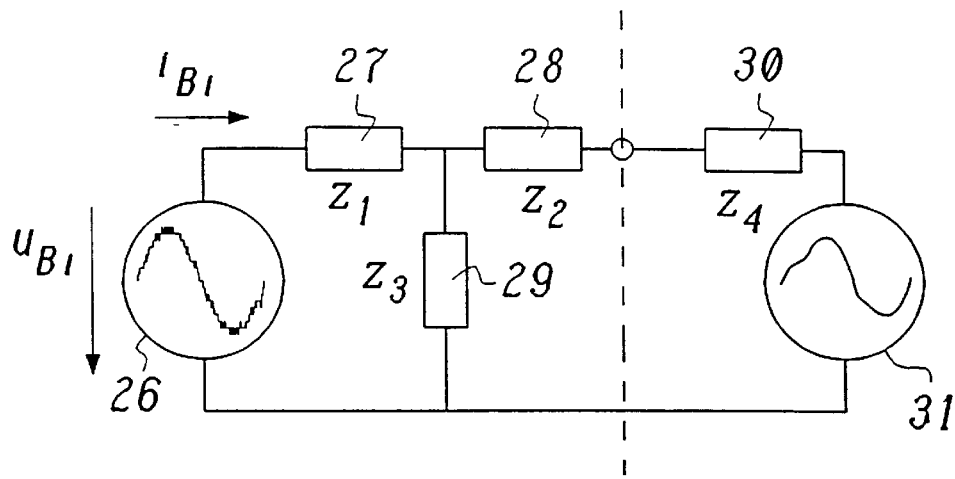
FIG. 5 shows the equivalent circuit diagram of the invertor (connected to the railway grid) from FIG. 4 without center-point grounding of the transformer.
Figure 6:
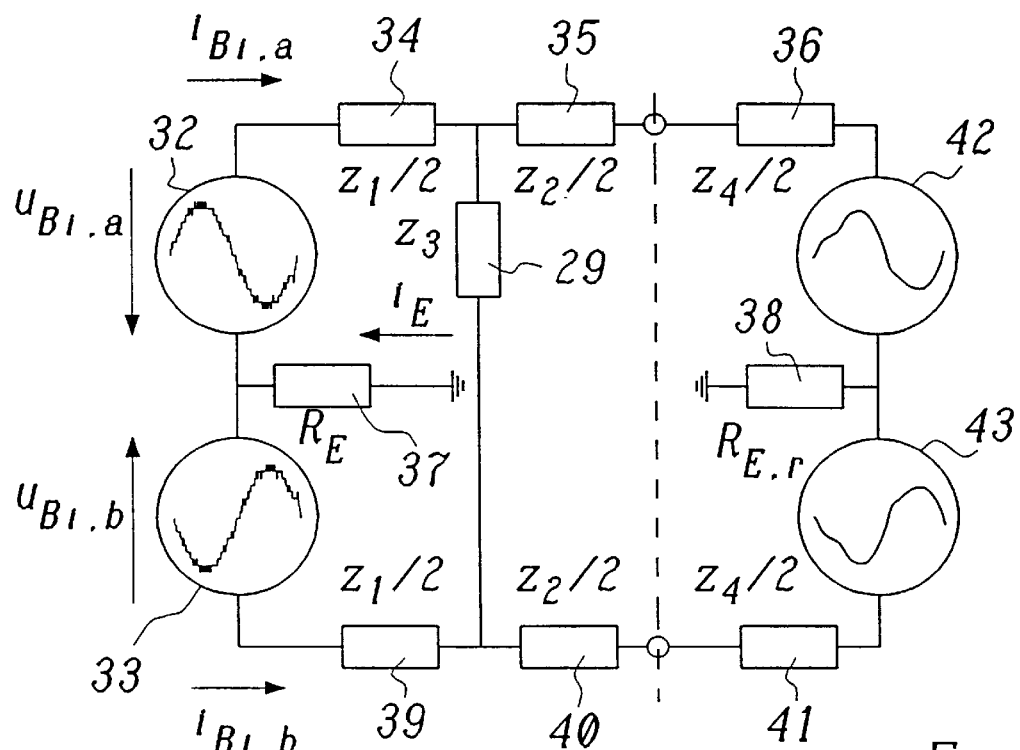
FIG. 6 shows the equivalent circuit diagram corresponding to FIG. 5 with center-point grounding.
Figure 7:
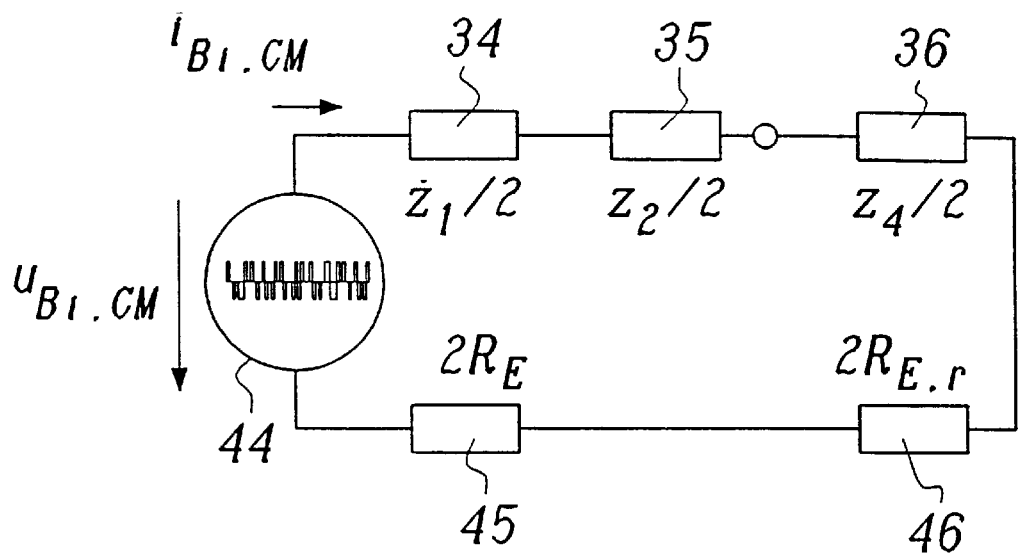
FIG. 7 shows the equivalent circuit diagram for the common-mode subsystem derived from the equivalent circuit diagram of FIG. 6.
Figure 8:
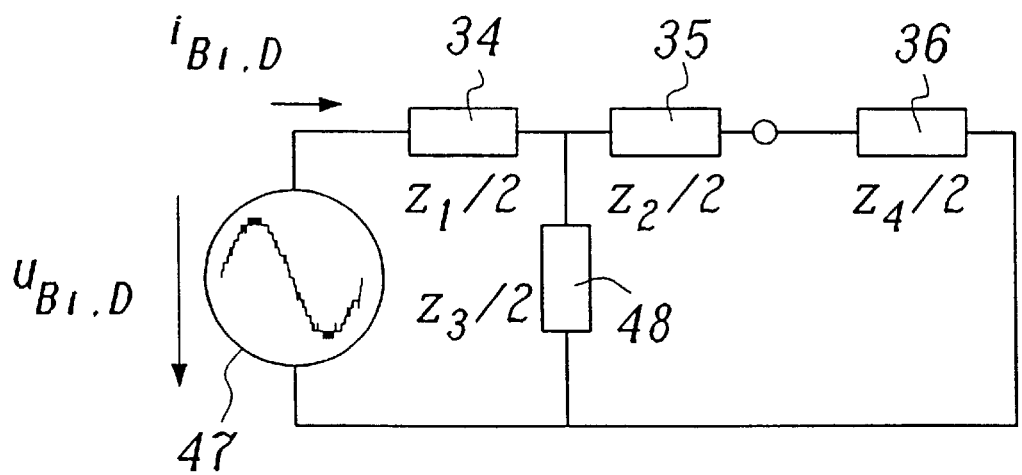
FIG. 8 shows the equivalent circuit diagram for the differential-mode subsystem derived from the equivalent circuit diagram of FIG. 6.
Figure 9:
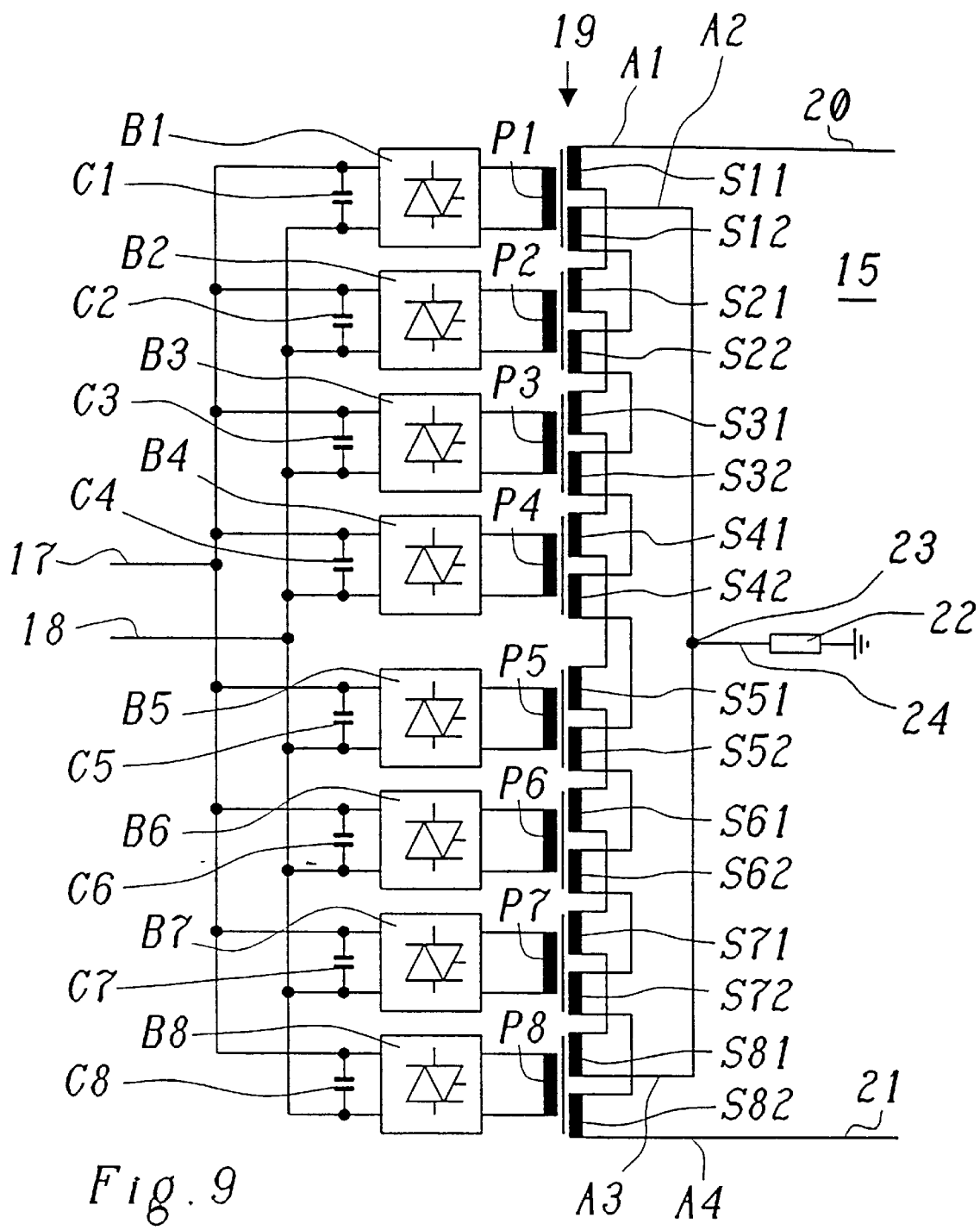
FIG. 9 shows a preferred exemplary embodiment of an invertor according to the invention with a division of the secondary windings of the invertor transformer into partial secondary windings and a specific wiring-up of the partial seconary windings.

Referring now to the drawings, wherein like reference numerals designate identical or corresponding parts throughout the several views, FIG. 9 represents a preferred exemplary embodiment of an invertor according to the invention. The invertor of FIG. 9 is essentially similar in its structure to the invertor of FIG. 2. Instead of one secondary winding S1, . . . , S8 per invertor bridge, the secondary windings in the transformer 19 are in this case subdivided into two identical partial secondary windings S11, S12; . . . ; S81, S82. The respective first (upper) partial secondary windings S11, . . . , S81 are connected in series one after the other and form a first series circuit with the outputs A1 (top) and A3 (bottom). The respective second (lower) partial secondary windings S12, . . . S82 are likewise connected in series one after the other and form a second series circuit, which is parallel to the first series circuit, with the outputs A2 (top) and A4 (bottom).

The common-mode currents flowing through the ground connection 24 and the optional grounding resistor 22 and the associated common-mode voltages are now switched off by virtue of the fact that the upper output A1 of the first series circuit formed by the partial secondary windings S11, ..., S81 forms one output of the invertor 15 and the lower output A4 of the second series circuit formed by the partial secondary windings S12, ..., S82 forms the other output of the invertor 15, and that the lower output A3 of the first series circuit and the upper output A2 of the second series circuit are joined together at the center tap 23 of the transformer 19.

The effect achieved by this type of division and interconnection of the secondary windings is that $$u_{Bi,a} = -u_{Bi,b} = u_{Bi,D} = \frac{1}{2} u_{Bi} \qquad (6)$$

and $$u_{Bi,CM} = 0 \qquad (7).$$

Since this type of structure of the transformer 19 grounded at the center tap eliminates the undesirable common-mode voltages virtually completely, without the differential-mode voltages being adversely affected, a maximum suppression effect is achieved acording to the invention by means of a comparatively simple change to the transformer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An invertor comprising a plurality of invertor bridges, which operate in parallel from the same DC voltage source and whose output voltages are summed via a transformer, which transformer has a number of primary windings and associated secondary windings which corresponds to the number of invertor bridges, each invertor bridge being respectively connected on the output side to a primary winding, and the secondary windings being connected in series for the purpose of summing the output voltages, and the invertor bridges each being driven with pulse duration modulation according to an auxiliary control voltage, and the auxiliary control voltages of the individual invertor bridges having a constant phase difference between one another, and the transformer having a center tap, which is grounded via a ground connection, wherein, in order to attenuate or suppress in-phase or common-mode interference currents flowing via the ground connection and the interference voltages associated with said interference currents, within the transformer, the secondary windings are each divided into a first and second identical partial secondary winding, and the partial secondary windings are connected to one another and to the center tap in such a way that the common-mode currents and voltages induced in the partial secondary windings mutually cancel one another out.

2. The invertor as claimed in claim 1, wherein the first partial secondary windings form a first series circuit, wherein the second partial secondary windings form a second series circuit, which is in parallel with the first series circuit, wherein the upper output of the first series circuit forms one output of the invertor and the lower output of the second series circuit forms the other output of the invertor, and wherein the lower output of the first series circuit and the upper output of the second series circuit are joined together at the center tap.

3. The use of an invertor as claimed in claim 1 in a converter having a DC voltage intermediate circuit.

4. The use of an invertor as claimed in claim 2, in a converter having a DC voltage intermediate circuit.

* * * * *